(12) United States Patent
Kanao

(10) Patent No.: US 7,717,648 B2
(45) Date of Patent: May 18, 2010

(54) METHOD FOR REPAIRING DRAINAGE PIPE

(75) Inventor: Shigeki Kanao, Nishinomiya (JP)

(73) Assignee: Kanaflex Corporation, Osaka (JP)

( * ) Notice: Subject to any disclaimer, the term of this patent is extended or adjusted under 35 U.S.C. 154(b) by 302 days.

(21) Appl. No.: 11/662,782

(22) PCT Filed: Jul. 29, 2005

(86) PCT No.: PCT/JP2005/013958

§ 371 (c)(1),
(2), (4) Date: Mar. 14, 2007

(87) PCT Pub. No.: WO2006/030585

PCT Pub. Date: Mar. 23, 2006

(65) Prior Publication Data

US 2007/0264085 A1    Nov. 15, 2007

(30) Foreign Application Priority Data

Sep. 16, 2004    (JP) .............................. 2004-269933

(51) Int. Cl.
*F16L 1/028*    (2006.01)
(52) U.S. Cl. ..................................... 405/184.2; 138/121
(58) Field of Classification Search ................ 405/184, 405/184.1, 184.2, 184.3, 184.4; 138/121, 138/122, 173, 174
See application file for complete search history.

(56) References Cited

U.S. PATENT DOCUMENTS

| | | | | |
|---|---|---|---|---|
| 4,337,800 A | * | 7/1982 | Carlson et al. | 138/122 |
| 4,420,019 A | * | 12/1983 | Dillon | 138/129 |
| 4,507,019 A | * | 3/1985 | Thompson | 405/184.3 |
| 4,796,669 A | * | 1/1989 | St. Onge | 138/97 |

(Continued)

FOREIGN PATENT DOCUMENTS

JP    1-15374    3/1989

(Continued)

OTHER PUBLICATIONS

Translation of JP2002-038581A.*

(Continued)

*Primary Examiner*—Tara Mayo-Pinnock
(74) *Attorney, Agent, or Firm*—Wenderoth, Lind & Ponack, LLP.

(57) ABSTRACT

In a method for repairing a drainage pipe, a resin pipe can be placed in an existing drainage pipe connected between connection bodies such as manholes while being buried in the ground, without causing an elongation. The method involves supplying a corrugated resin pipe 5, which is made by forming, spirally or in a ring shape, ridge portions 5c of a hard resin on the outer wall of a soft resin pipe 5d, 5e in which a reinforcement material 5f that restricts an elongation in the pipe axis direction has been embedded, into the existing drainage pipe through the upper opening of either of the connection bodies; inserting the head of the corrugated resin pipe 5 thus supplied from a drainage pipe opening connected to either of the connection bodies; pulling the corrugated resin pipe 5 thus inserted into the drainage pipe from the other side of the connection body; and laying the corrugated resin pipe 5 over the entire length of the drainage pipe.

9 Claims, 7 Drawing Sheets

U.S. PATENT DOCUMENTS

| | | | |
|---|---|---|---|
| 4,907,624 A | | 3/1990 | Jonasson |
| 4,954,016 A | * | 9/1990 | Storgard ..................... 405/184 |
| 5,193,588 A | * | 3/1993 | Kanao ........................ 138/133 |
| 5,573,038 A | * | 11/1996 | Kanao ........................ 138/122 |
| 5,671,778 A | * | 9/1997 | Sakuragi et al. ............... 138/97 |
| 6,186,182 B1 | * | 2/2001 | Yoon .......................... 138/122 |
| 6,907,906 B1 | * | 6/2005 | Cook et al. ................. 138/109 |

FOREIGN PATENT DOCUMENTS

| | | |
|---|---|---|
| JP | 3-92331 | 4/1991 |
| JP | 9-123279 | 5/1997 |
| JP | 2002-38581 | 2/2002 |

OTHER PUBLICATIONS

Japanese Office Action (including English translation) issued Nov. 4, 2008 in corresponding Japanese Patent Application No. 2004-269933.

Japanese Office Action issued Apr. 1, 2008 in a Japanese application which is a foreign counterpart to the present application (with English translation).

* cited by examiner compressed to 1/3S

L (m)

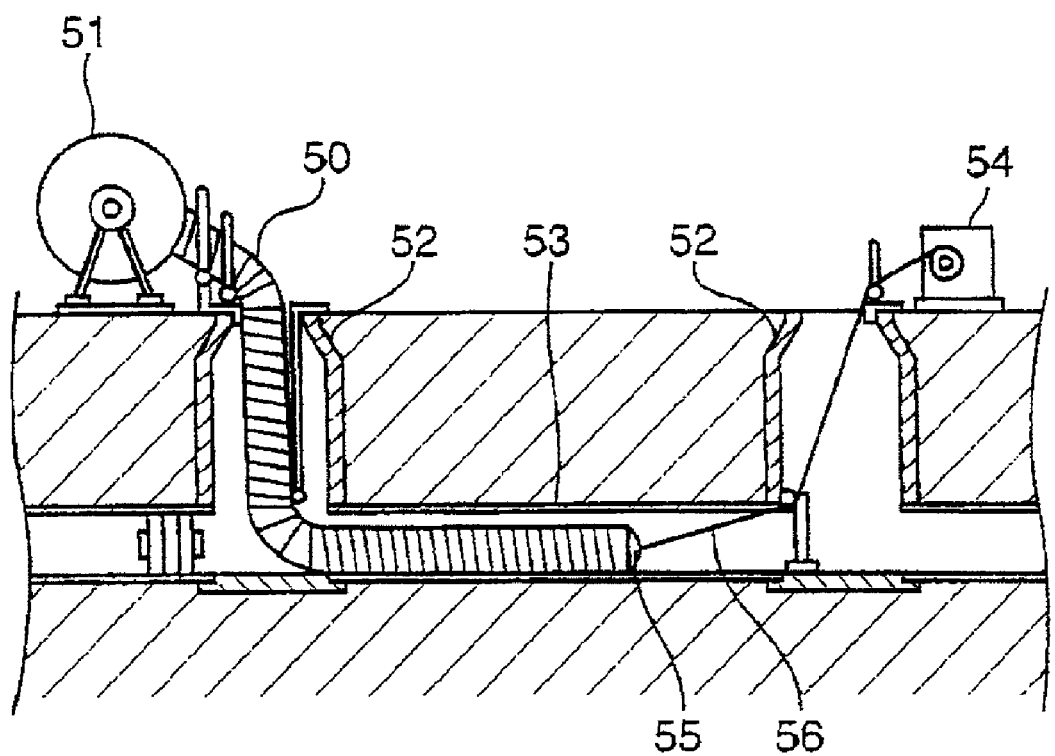
FIG. 9 - PRIOR ART

METHOD FOR REPAIRING DRAINAGE PIPE

BACKGROUND OF THE INVENTION

1. Technical Field

The present invention relates to a method for repairing drainage pipes such as an obsolete sewer pipe.

2. Background Art

If a sewer pipe buried in the ground for a long time becomes obsolete to cause its load resistance or waterproofness to be degraded, then there will exist a problem in that a road may sink or a flow-down ability of the pipe may become insufficient.

As a method to solve such a problem, there has been proposed and performed a drainage pipe repairing method in which a resin pipe is placed in an obsolete sewer pipe by utilizing the sewer pipe as a supporting body to produce a new sewer pipe.

Among the various existing methods of repairing the above-mentioned drainage pipe, for example, there is a pipe manufacturing method in which a band-shaped rigid PVC material is supplied in a manhole, and then inserted into an existing pipe while being formed into a pipe shape at the inlet portion of the existing pipe by a pipe manufacturing machine.

Further, there is also known a so-called sheath pipe technique in which instead of the band-shaped rigid PVC material, a short pipe that is shorter in length and smaller in pipe diameter than those of the existing pipe is carried in from a manhole, and then inserted into the existing pipe while being successively connected.

However, the above-mentioned pipe manufacturing technique requires a work facility dedicated for the pipe manufacturing machine and the like, and also skilled workers to perform the technique. On the other hand, the above-mentioned sheath pipe technique requires no pipe manufacturing machine, but the sheath pipe has been manufactured as a pipe, so that the pipe is not easily handled within a narrow manhole.

Moreover, both the techniques require a connecting operation to form a pipe shell within an existing pipe, so that there also exists a problem in that substantial working time must be spent to improve the sealing of the connection portions.

Therefore, for example, Japanese Patent Application Laid-Open No. 2002-38581 discloses a method as a recent technique capable of simply forming a pipe shell within an existing pipe without requiring a dedicated work facility. In this technique, as shown in FIG. 9, a flexible resin pipe 50 is supplied from a rotating drum 51, inserted through a manhole 52 from one side of an existing pipe 53 by utilizing the flexibility of the resin pipe 50, and then taken up from the other side of the existing pipe 53 by means of a winch 54.

Further, in the figure, reference numeral 55 designates a cap mounted onto a head of the resin pipe 50, and reference numeral 56 designates a wire connected to the cap 55.

However, although the technique described in the above-mentioned Patent Publication uses the resin pipe 50 that is integrally made by forming, spirally or in a ring shape, corrugated portions having convex portions and concave portions (the convex portions are independent from each other) in the pipe axis direction thereof, or the resin pipe 50 that is integrally formed by making the surface thereof flat without convex portions and concave portions, priority is given to the flexibility over the tensile strength by taking the workability into account, so that there exists a problem in that when the resin pipe 50 is pulled roughly by the winch 54, an elongation of the pipe that exceeds the original length of the resin pipe may occur and cause the load resistance to be degraded.

Also, when an attempt is made to construct the resin pipe 50 inserted into a lengthy existing pipe as seamless pipe, there exists another problem in that the resin pipe 50 also becomes lengthy and thus the rotating drum 51 for winding up the lengthy resin pipe 50 becomes larger in size.

The present invention is made to consider problems in a conventional drainage pipe repairing method as described above; a first object of the invention is to provide a drainage pipe repairing method in which a resin pipe can be pulled in an existing drainage pipe without developing an elongation, and a second object thereof is to provide a drainage pipe repairing method in which a resin pipe inserted into an existing pipe can achieve a compact design.

SUMMARY OF THE INVENTION

The present invention for achieving the above-mentioned objects is a method for repairing a drainage pipe which is connected between connection bodies such as manholes while being buried in the ground, and guides sewage, rainwater and the like to the connection bodies, comprising steps of: carrying in a corrugated resin pipe, which is made by forming, spirally or in a ring shape, ridge portions of a hard resin on the outer wall of a soft resin pipe in which a reinforcement material that restricts an elongation in the pipe axis direction has been embedded, from the upper opening of either of the connection bodies; inserting the head of the corrugated resin pipe thus carried in from a drainage pipe opening connected to either of the connection bodies; pulling the corrugated resin pipe thus inserted into the drainage pipe from the other side of the connection body; and laying the corrugated resin pipe over the entire length of the drainage pipe.

According to the present invention, a reinforcement material that restricts an elongation in the pipe axis direction has been embedded in a soft resin pipe comprising a corrugated resin pipe and improved the tensile strength, so that when the corrugated resin pipe is pulled in an existing drainage pipe, can be arranged without developing an elongation therein.

In the present invention, the above-mentioned soft resin pipe has a lower wound soft resin layer and an upper wound soft resin layer, and a reticulated reinforcement material as the reinforcement material can be placed between these resin layers.

The above-mentioned reticulated reinforcement material can be formed by being knitted into reticulated shape when a plurality of resin fibers is wound onto the lower wound soft resin layer. The reinforcement material can also be formed by winding spirally a resin reticulated band formed into a band shape having a mesh on the lower wound soft resin layer.

In the present invention, in a case where the above-mentioned corrugated resin pipe is composed so that it can be contracted in the pipe axis direction thereof, the corrugated resin pipe is arranged above a connection body while being contracted, and when the corrugated resin pipe is carried in the connection body, or when the pipe is carried in the connection body while being contracted and then inserted through a drainage pipe opening, the corrugated resin pipe can be extended successively from the head thereof.

In the present invention, the corrugated resin pipe can be contracted by being formed so as to provide a sag in the soft resin pipe and in the reticulated reinforcement material between the above-mentioned ridge portions.

In the present invention, when the corrugated resin pipe is laid over the entire length of the above-mentioned drainage pipe, and then a filler is injected between the inner wall of the drainage pipe and the outer wall of the corrugated resin pipe, the drainage pipe and the corrugated resin pipe can be integrated due to the hardening of the filler. In this case, when the outer peripheral side of the above-mentioned ridge portion is formed more widely than the base side thereof, the filler can be hardened while being placed around the base side, thereby providing an anchor effect on the ridge portion.

According to the present invention, when a new corrugated resin pipe is pulled into an obsolete existing pipe, no elongation develops in the corrugated resin pipe, so that the corrugated resin pipe can be arranged without degrading the load resistance thereof.

Further, using a corrugated resin pipe capable of being contracted in the pipe axis direction, allows the corrugated resin pipe inserted into an existing pipe to become compact, whereby an advantage is obtained in that the handling in transferring and executing becomes easy.

BRIEF DESCRIPTION OF THE DRAWINGS

FIG. 4 (b) and FIG. 4 (c) are explanatory views showing variations of the ridge portion.

FIGS. 6(a) and (b) show a corrugated resin pipe used in a second embodiment of the present invention.

FIG. 9 is a cross sectional view showing a conventional drainage pipe repairing method.

DETAILED DESCRIPTION OF THE INVENTION

Figure 1:
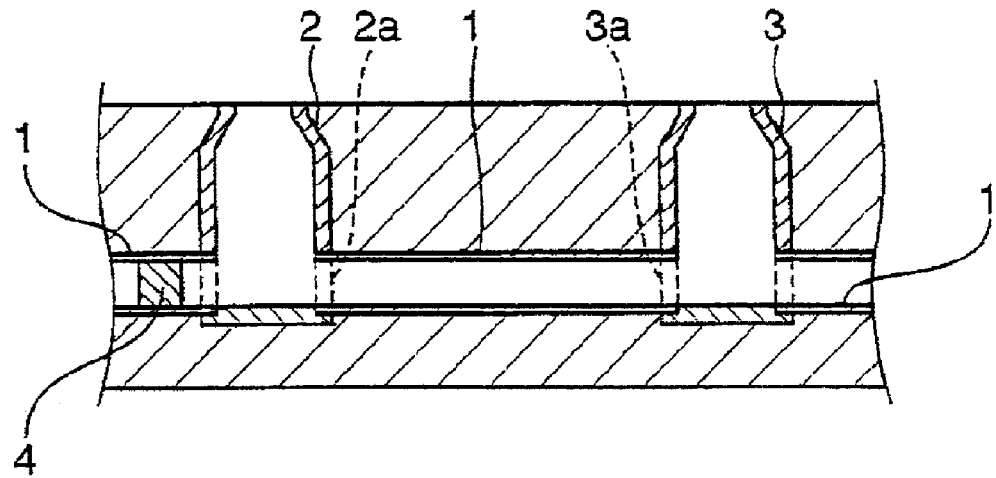
FIG. 1 is a cross sectional view showing a sewer pipe construction to which the present invention is applied.

Hereinafter, the present invention will be explained based on the embodiments shown in the drawings.

FIG. 1 shows a drainage pipe construction to which the drainage pipe repairing method of the present invention is applied.

In FIG. 1, a plurality of drainage pipes 1 buried in the ground is normally composed of concrete pipes, and each drainage pipe 1 is connected to both openings 2a and 3a provided under respective manholes (connection bodies) 2 and 3 disposed in a drainage route.

When checking the drainage pipe 1, first, a camera is inserted within the pipe to examine whether a crack exists or not. As a result of the examination, if a crack exists and a repairing is required, then as a preparatory repairing, the inside of the drainage pipe 1 is washed with a high-pressure washing water. Reference numeral 4 designates a water stop plug for preventing the washing water from entering into another drainage pipe.

Then, the drainage pipe repairing method of the present invention is applied to the washed drainage pipe.

Figure 2:
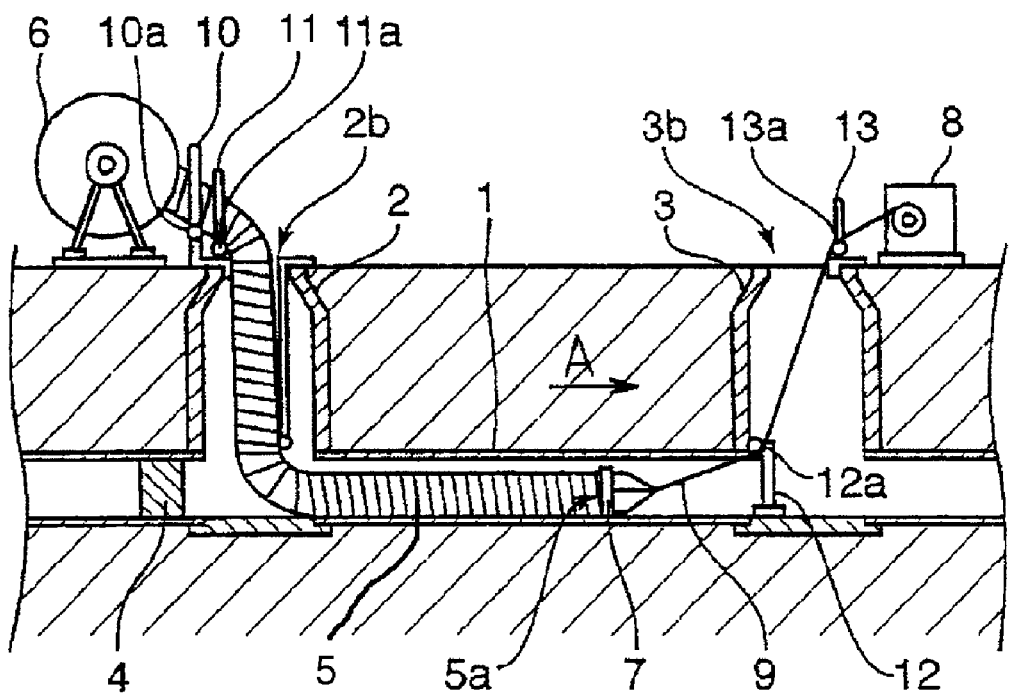
FIG. 2 is a cross sectional view illustrating a drainage pipe repairing method in connection with a first embodiment of the present invention.

FIG. 2 shows the first embodiment in connection with the drainage pipe repairing method.

In a drainage pipe construction in which one end of the drainage pipe 1 is connected to the left side manhole 2, while the other end is connected to the right side manhole 3, a rotating drum 6 onto which a corrugated resin pipe 5 has been wound is arranged at one of the manholes, near the upper opening 2b of the left side manhole 2 in this embodiment.

The corrugated resin pipe 5 released from the rotating drum 6 is inserted through the upper opening 2b into the left-side manhole 2, and the head 5a thereof is mounted with a lead-in jig 7.

On the other hand, arranged near an upper opening 3b of the right-side manhole 3 is a winch 8, and a wire 9 released from the winch 8 is connected with the above-mentioned lead-in jig 7. Therefore, driving the winch 8 in the wind-up direction causes the corrugated resin pipe 5 to be pulled by the wire 9 in the arrow A direction.

Further, in the drawings, reference numerals 10 and 11 designate arch-shape guides for guiding the corrugated resin pipe 5 into the left-side manhole 2, and provided on the lower portion of the arch-shape guides are respective guide rollers 10a and 11a for smoothly conveying the corrugated resin pipe 5.

Moreover, reference numerals 12 and 13 designate arch-shape guides provided on the outlet side of the drainage pipe 1, and respective guide rollers 12a and 13a are provided on the portion on which the corrugated resin pipe 5 slides.

Figure 3:
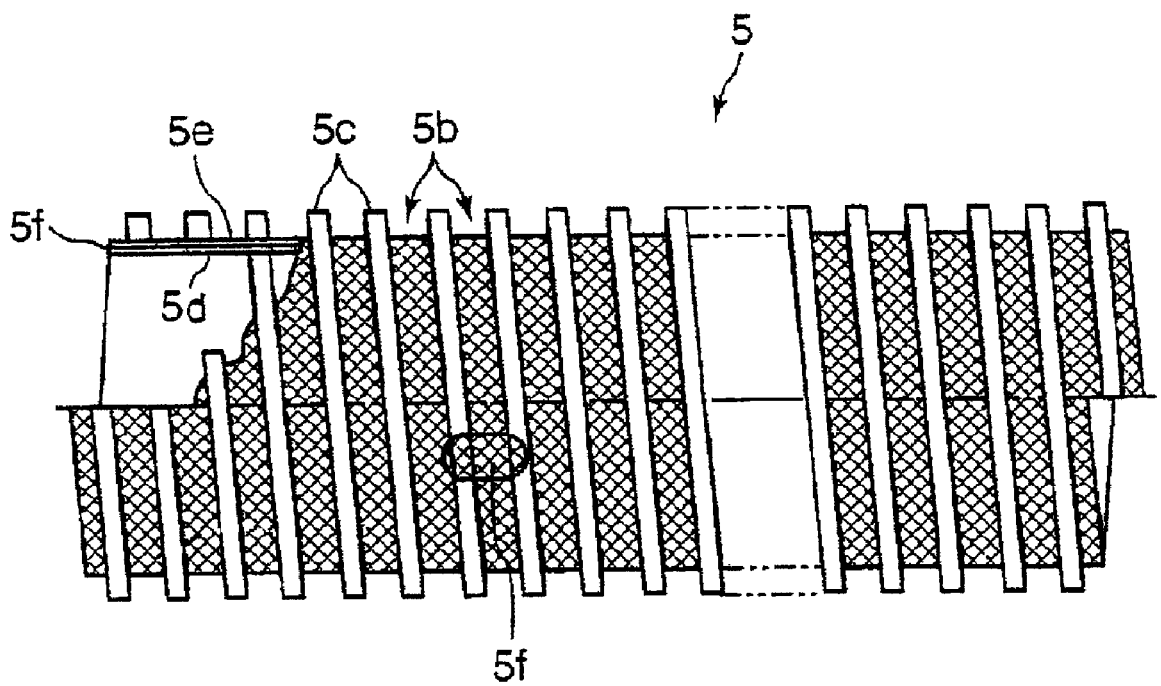
FIG. 3 is an enlarged view of the corrugated resin pipe shown in FIG. 2.

FIG. 3 shows an enlarged view of the above-mentioned corrugated resin pipe 5.

The corrugated resin pipe 5 has a straight-pipe portion 5b and a ridge portion 5c formed spirally on the outer wall of the straight-pipe portion 5b, and the above-mentioned straight-pipe portion 5b consists of a lower wound soft resin layer 5d, an upper wound soft resin layer 5e, and a reticulated reinforcement material 5f provided between both the resin layers.

The lower and upper soft resin layers 5d and 5e can be formed of a thermoplastic resin having a higher chemical resistance, for example, polyvinyl chloride and polyolefin resin, or of a thermoplastic elastomer, for example, those based on olefin and on styrene, and when both the lower wound soft resin layer 5d and the upper wound soft resin layer 5e are formed into pipes, the reticulated reinforcement material 5f is sandwiched between the resin layers 5d and 5e.

The reticulated reinforcement material 5f is designed to be formed into a reticulated shape when reinforcing yarns supplied from a plurality of bobbins on a yarn supply board (not shown) are wound onto the lower wound soft resin layer 5d, and the reinforcing yarns of the reticulated reinforcement material 5f thus formed are connected from one end of the corrugated resin pipe 5 to the other end thereof, so that the reinforcing yarns are designed to counteract the tension in the pipe axis direction.

Further, although the above-mentioned reinforcing yarns can use resin fibers such as those of polyester, nylon and polyamide, the yarns are not limited to them, and can also use yarns, for example, those of carbon fibers and the like.

Moreover, the ridge portion 5c can be composed of a thermoplastic resin having a higher chemical resistance, for example, polyvinyl chloride, polyolefin resin and the like.

Figure 4:
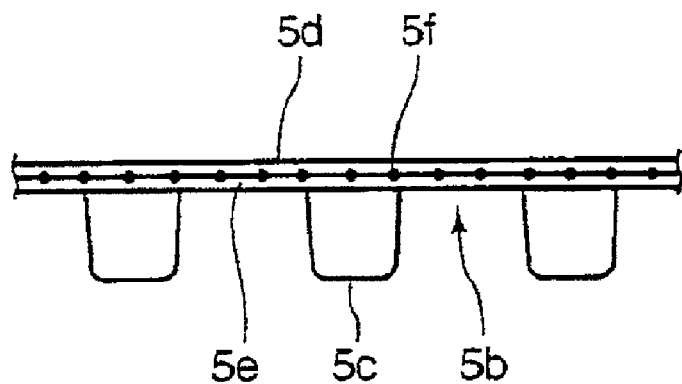
FIG. 4 (a) is an enlarged view of a ridge portion of the corrugated resin pipe shown in FIG. 3.
Figure 4:
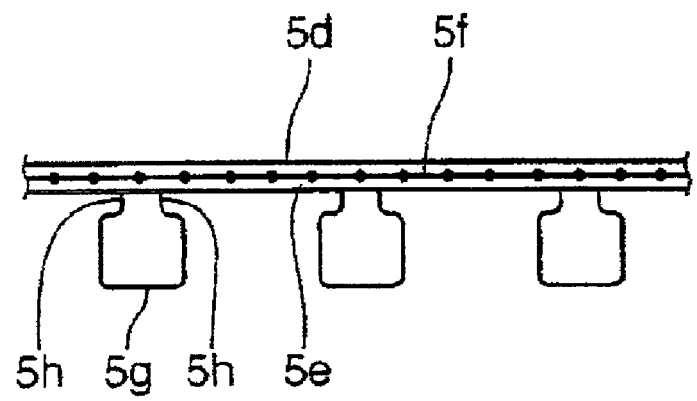
Figure 4C:
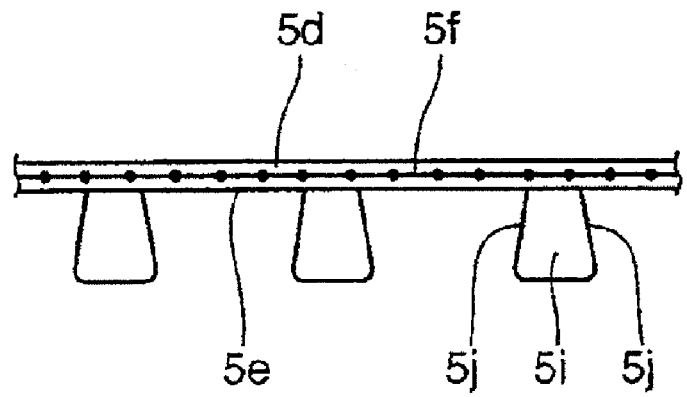

Although the above-mentioned ridge portion 5c, as shown in FIG. 4 (a), can be formed into a trapezoid shape in the outward direction from the outer face of the straight pipe portion 5b, when providing an anchor effect thereon, the ridge portion can be formed into a shape as shown in FIG. 4 (b) or as shown in FIG. 4 (c).

A ridge portion 5g shown in FIG. 4 (b) is formed on a thin wall portion 5h on both the left and right sides of the base of the rectangular ridge portion 5g.

With such a thin wall portion 5h provided, when the corrugated resin pipe 5 is pulled into the drainage pipe 1, and then a grout (a mortar) is injected into an annular gap between the inner wall of the drainage pipe 1 and the outer wall of the corrugated resin pipe 5 thus pulled in, the grout becomes hardened while biting into the thin wall portion 5h, so that the ridge portion 5g can have an anchor effect.

Moreover, a ridge portion 5i shown in FIG. 4 (c) is formed so as to be tapered toward the pipe center side. Thus, providing inclined faces 5j exhibiting a taper on both the left and right sides of the ridge portion 5i allows also the ridge portion 5i to have an anchor effect.

Then, with reference again to FIG. 2, the drainage pipe repairing method will be explained.

The method comprises steps of:

releasing the corrugated resin pipe 5 wound onto the rotating drum 6, and inserting the head 5a thereof into the manhole 2 through the top opening 2b of one manhole 2 of the manholes 2 and 3 adjacent to each other in the disposed route;

mounting the lead-in jig 7 an one end of the corrugated resin pipe 5 thus carried in, with the lead-in jig 7 in turn being connected to the wire 9 pulled from the other manhole 3; and driving the winch 8 causes the wire 9 to be wound up, thereby pulling the corrugated resin pipe 5 into the drainage pipe 1.

Further, although the corrugated resin pipe 5, when pulled into the drainage pipe 1, is pulled while coming in contact with the inner wall of the drainage pipe 1, the outer diameter of the corrugated resin pipe 5 is selected so as to be smaller than the inside diameter of the drainage pipe 1, so that the sliding resistance when pulled is small.

Moreover, although when the corrugated resin pipe 5 is pulled by the wire 9, a tensile load is concentrated onto the straight pipe portion 5b (see FIG. 3) of soft resin layers, the straight pipe portion 5b is provided with the reticulated reinforcement material 5f to counteract the tensile load, so that the corrugated resin pipe 5 does not elongate to a length more than that specified in the product specification (i.e. does not elongate beyond a product length).

Figure 5:
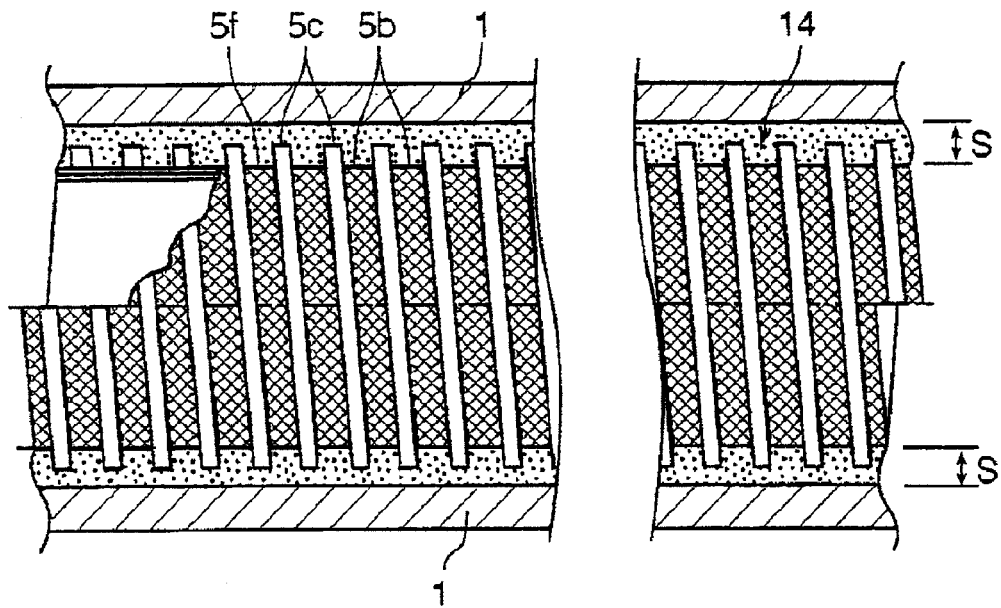
FIG. 5 is a cross sectional view showing a construction completion state according to the first embodiment.

When the corrugated resin pipe 5 is penetrated into the drainage pipe 1, as shown in FIG. 5, a grout 14 is injected in an annular gap S between the inner wall of the drainage pipe 1 and the outer wall of the corrugated resin pipe 5.

The grout 14 is produced by mixing a mortar and a chemical, and filled into the annular gap S in order to provide water stoppage and integration.

If the ridge portion 5c of the corrugated resin pipe 5 has an anchor effect as shown in FIG. 4 (b) or FIG. 4 (c), then when the hardening of the grout 14 thus filled has completed, the corrugated resin pipe 5 is integrated through the grout 14 with the drainage pipe 1, thereby preventing the resin pipe from being separated from the grout 14.

Further, a filler for integrating the corrugated resin pipe 5 with the drainage pipe 1 is not limited to the above-mentioned grout 14, and may be a plastic foam, for example, a polyurethane foam obtained by mixing a base material having isocyanate as a major ingredient with a hardening agent having polyol as a major ingredient.

Figure 6:
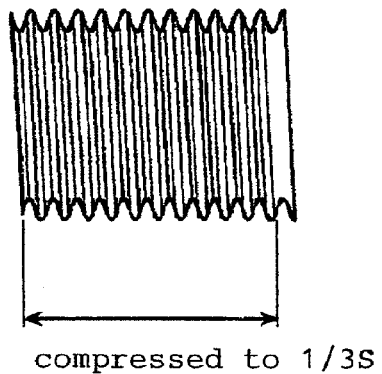
FIG. 6 (a) is a side view showing a contracted state, and FIG. 6 (b) is a side view showing an extended state.
Figure 6:
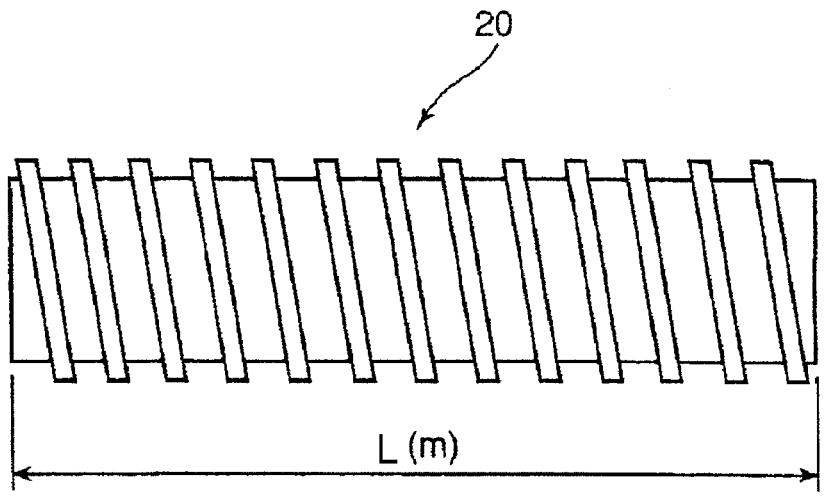
Figure 7:
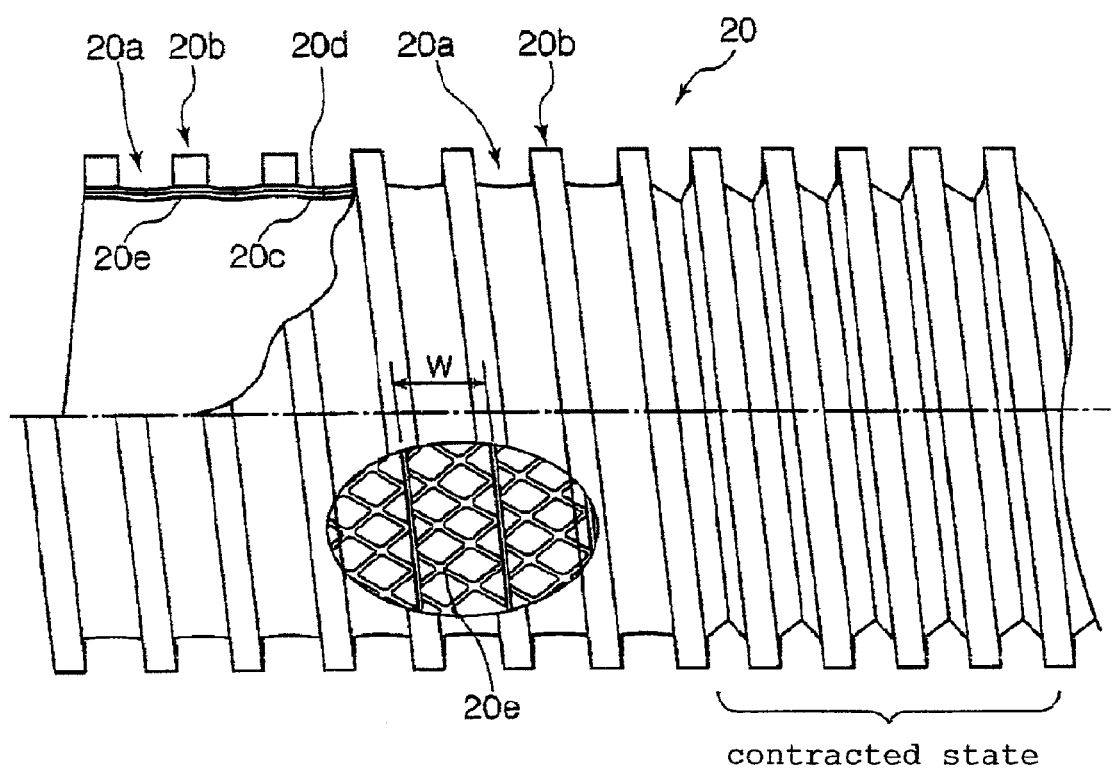
FIG. 7 is an enlarged view of the corrugated resin pipe shown in FIGS. 6(a) and (b).

FIGS. 6(a) and (b) and FIG. 7 show a second embodiment of the drainage pipe repairing method of the present invention.

First, FIGS. 6(a) and (b) show the composition of a corrugated resin pipe 20 used in the second embodiment, in which the corrugated resin pipe 20 is designed to be deformed into a contracted state shown in FIG. 6 (a) by being compressed in the pipe axis direction, and deformed into an extended state shown in FIG. 6 (b) by being pulled in the pipe axis direction, whereby the resin pipe when contracted can be shrunk into a length of about one third the pipe length L when extended.

This expansible corrugated resin pipe 20, as shown in the enlarged view of FIG. 7, consists of a straight-pipe portion 20a and a ridge portion 20b formed spirally on the outer face of the straight-pipe portion 20a.

The straight-pipe portion 20a consists of a lower wound soft resin layer 20c, an upper wound soft resin layer 20d, and a reticulated reinforcement material 20e provided between both the resin layers.

The straight-pipe portion 20a is formed into a state in which the portion 20a is curved somewhat toward the pipe center between the ridge portions 20b adjacent thereto. Providing a deflection forcedly in this manner allows the corrugated resin pipe 20a to be compressed in the pipe axis direction and shrunk into a bellows shape.

The lower and upper soft resin layers 20c and 20d can be formed of a thermoplastic resin having a higher chemical resistance, for example, polyvinyl chloride and polyolefin resin, or of a thermoplastic elastomer, for example, those based on olefin and on styrene.

The reticulated reinforcement material 20e is obtained by forming a resin such as polyester, nylon and polyamide into a band shape having a mesh, and formed by winding spirally a reticulated band of a width W onto the outer face of the lower wound soft resin layer 20c in a process in which the lower wound soft resin layer 20c is formed into a pipe.

The reticulated reinforcement material 20e has a flexibility such that the material can be deformed following up a condition in which the straight-pipe portion 20a is folded into a bellows shape when the corrugated resin pipe 20 is contracted, so that the material has also a predetermined tensile strength such that the straight-pipe portion 5a does not extend so as to exceed a condition in which the portion is pulled in a straight line when pulled in the pipe axis direction.

Moreover, the ridge portion 20b can be formed of a thermoplastic resin having a higher chemical resistance, for example, polyvinyl chloride and polyolefin resin, and can be formed into a shape shown in FIG. 4 (b) or FIG. 4 (c) in order to enhance an anchor effect.

Then, the drainage pipe repairing method by using the above-mentioned expansible corrugated resin pipe 20 will be explained with reference to FIGS. 8(a) and (b). Further, in the figure, the same constituents as FIG. 2 are designated by the same reference numerals to omit their explanations.

Figure 8:
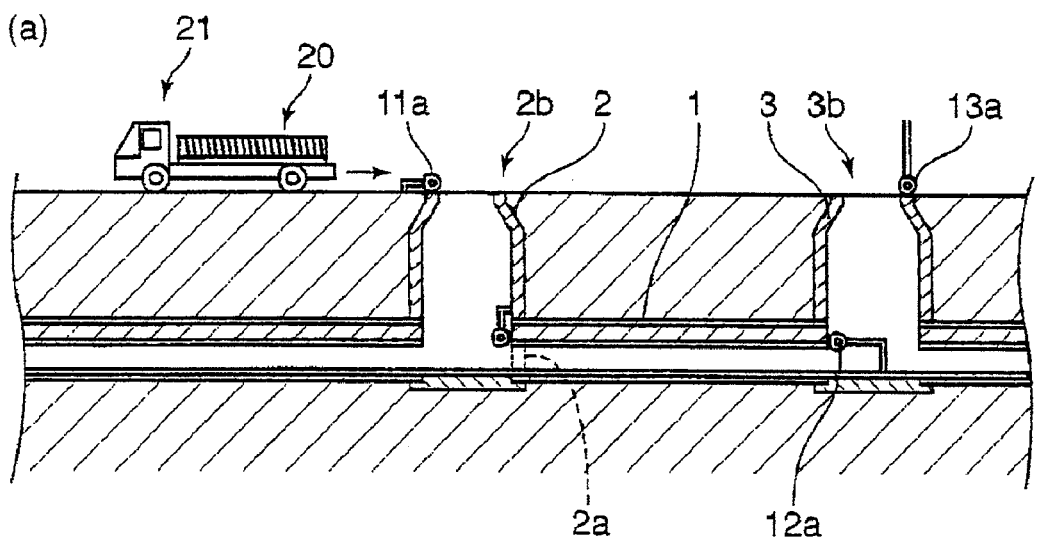
FIG. 8 (a) is an explanatory view showing a state before the corrugated resin pipe according to the second embodiment is supplied into a drainage pipe, and FIG. 8 (b) is an explanatory views showing a state in which the corrugated resin pipe is pulled into the drainage pipe.
Figure 8:
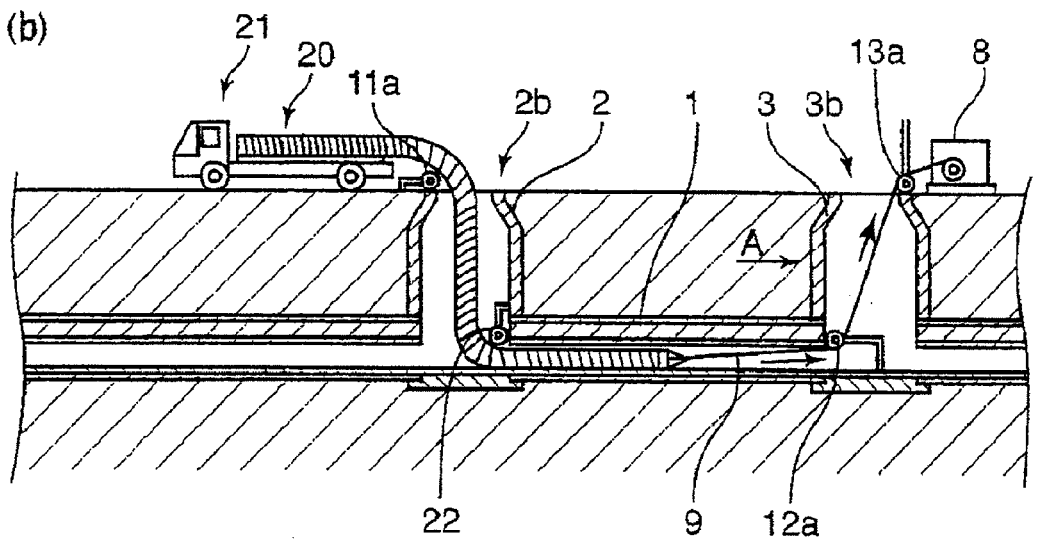

FIG. 8 (a) shows a state in which the corrugated resin pipe 20 made compact by being contracted in the pipe axis direction is loaded on the deck of a truck 21, and is forcedly introduced through the manhole 2. FIG. 8 (b) shows a state in which the truck 21 is stopped near the manhole 2, and the corrugated resin pipe 20 loaded on the deck is sequentially extended from the head and inserted into the manhole 2.

The corrugated resin pipe 20 to be extended is lowered downward from the position of the guide roller 11a, faced in the horizontal direction at the position of the guide roller 22 provided near the opening 2a under the manhole 2, and then introduced into the drainage pipe 1.

The corrugated resin pipe 20 thus introduced into the drainage pipe 1 is pulled in the direction of the arrow A by the wire 9, and then pulled out through the manhole 3 on the other side.

Further, the position at which the corrugated resin pipe 20 starts to extend may be on the deck of the truck 21, or may be in the opening 2a of the manhole 2.

In this way, in the drainage pipe repairing method using the expansible corrugated resin pipe 20, the corrugated resin pipe 20 before being carried in the manhole 2 can be made compact, so that the corrugated resin pipe 20 is very easily handled without being bulky when transported. In addition, a large rotating drum is not required to be installed, so that a large-diameter corrugated resin pipe 20 without being limited by the bore size can be used to repair the drainage pipe 1.

Further, in the above-mentioned first embodiment, the reticulated reinforcement material 5f used for the corrugated resin pipe 5 can be used for the corrugated resin pipe 20 of the second embodiment, and conversely, the reticulated reinforcement material 20e used for the corrugated resin pipe 20 can be used as a reinforcement material of the corrugated resin pipe 5 in connection with the first embodiment.

Moreover, although the ridge portions of the above-mentioned embodiments are spirally formed, the ridge portions are not limited to the shape, and can be formed into a ring shape.

INDUSTRIAL APPLICABILITY

The present invention relates to a method for repairing a drainage pipe applicable to the repairing of sewer pipes and the like, and is suitable for a sewer pipe that becomes obsolete to cause the load resistance and water stoppage ability to be degraded, and for the installation of a new drainage pipe performed inside the sewer pipe used as a supporting body.

The invention claimed is:

1. A method of repairing a drainage pipe that is buried in the ground, is connected between a pair of connection bodies respectively having upper access openings, and is configured for guiding sewage and rainwater therethrough, said method comprising:
   providing a corrugated resin pipe having a pipe axis and being extendible and contractible along a pipe axis direction, said corrugated resin pipe having a leading head part and comprising a soft resin straight pipe portion, and hard resin ridge portions formed spirally or in rings on an outer wall of said soft resin straight pipe portion, said soft resin straight pipe portion having a reinforcement material embedded therein that restricts elongation in the pipe axis direction so as to prevent said soft resin straight pipe portion of said corrugated resin pipe from elongating beyond a product length thereof upon application of tensile force thereto;
   supplying said corrugated resin pipe into one of the connection bodies from said upper access opening thereof;
   inserting said head part of said corrugated resin pipe into the drainage pipe through an opening that connects the drainage pipe to said one of the connection bodies;
   extending said corrugated resin pipe successively from said head part of said corrugated resin pipe from a contracted condition of said corrugated resin pipe either in said supplying of said corrugated resin pipe into said one of the connection bodies from said upper access opening thereof from a position of the corrugated resin pipe arranged above said one of the connection bodies, or in said inserting of said corrugated resin pipe into the drainage pipe through the opening that connects the drainage pipe to said one of the connection bodies from a position of said corrugated resin pipe in said one of the connection bodies;
   pulling, from the other of said connections bodies, said corrugated resin pipe into the drainage pipe; and
   laying said corrugated resin pipe over an entire length of the drainage pipe between said connection bodies.

2. The method for repairing a drainage pipe, according to claim 1, wherein
   said soft resin straight pipe portion comprises an inner soft resin layer and an outer soft resin layer wound about said inner soft resin layer; and
   said reinforcement material embedded in said soft resin straight pipe portion comprises a reticulated reinforcement material disposed between said inner soft resin layer and said outer soft resin layer of said soft resin straight pipe portion.

3. The method for repairing a drainage pipe, according to claim 2, wherein said reticulated reinforcement material is formed by being knitted into a reticulated shape when a plurality of resin fibers are wound onto the said inner soft resin layer.

4. The method for repairing a drainage pipe, according to claim 2, wherein said reinforcement material is formed by winding spirally a resin reticulated band formed into a band shape having a mesh on said inner soft resin layer.

5. The method for repairing a drainage pipe, according to claim 2, wherein there is provided a sag in said soft resin straight pipe portion between said ridges.

6. The method for repairing a drainage pipe, according to claim 1, wherein after said corrugated resin pipe is laid over the entire length of the drainage pipe, a filler is injected between an inner wall of the drainage pipe and an outer wall of said corrugated resin pipe, and said filler is hardened to cause the drainage pipe and said corrugated resin pipe to be integrated.

7. The method for repairing a drainage pipe according to claim 6, wherein each said ridge portion has an outer peripheral end that is wider than a base end thereof, and said filler is made hardened while being placed around said base end.

8. The method for repairing a drainage pipe, according to claim 1, wherein
   said soft resin straight pipe portion is formed in a bellows configuration to allow said corrugated resin pipe to be expanded and contracted along said direction along said pipe axis without causing elongation of said corrugated resin pipe beyond the product length thereof.

9. The method for repairing a drainage pipe, according to claim 1, wherein
   said reinforcement material comprises reinforcing yarns extending from one end of said corrugated resin pipe to the other end thereof so as to counteract tension in said direction along said pipe axis.

\* \* \* \* \*